US 11,726,213 B2

(12) United States Patent
Mu

(10) Patent No.: US 11,726,213 B2
(45) Date of Patent: Aug. 15, 2023

(54) FAST AND PRECISE POSITIONING METHOD AND SYSTEM

(71) Applicant: Beijing Future Navigation Technology Co., Ltd, Beijing (CN)

(72) Inventor: Xucheng Mu, Beijing (CN)

(73) Assignee: Beijing Future Navigation Technology Co., Ltd, Beijing (CN)

( * ) Notice: Subject to any disclaimer, the term of this patent is extended or adjusted under 35 U.S.C. 154(b) by 126 days.

(21) Appl. No.: 15/734,446

(22) PCT Filed: Nov. 23, 2018

(86) PCT No.: PCT/CN2018/117070
§ 371 (c)(1),
(2) Date: Dec. 2, 2020

(87) PCT Pub. No.: WO2019/233045
PCT Pub. Date: Dec. 12, 2019

(65) Prior Publication Data
US 2021/0223405 A1 Jul. 22, 2021

(30) Foreign Application Priority Data
Jun. 4, 2018 (CN) .......................... 201810566043.4

(51) Int. Cl.
*G01S 19/40* (2010.01)
*G01S 19/42* (2010.01)
(Continued)

(52) U.S. Cl.
CPC .............. *G01S 19/40* (2013.01); *G01S 19/42* (2013.01); *G01S 19/52* (2013.01); *G01S 19/06* (2013.01);
(Continued)

(58) Field of Classification Search
CPC .......... G01S 19/42; G01S 19/06; G01S 19/07; G01S 19/23; G01S 19/52; G01S 19/40; G01S 19/00; H04B 7/195
(Continued)

(56) References Cited

U.S. PATENT DOCUMENTS 6,373,432 B1 * 4/2002 Rabinowitz ........ H04B 7/18552
342/357.29
6,480,788 B2 * 11/2002 Kilfeather ............... G01S 19/40
701/485
(Continued)

FOREIGN PATENT DOCUMENTS

CN 106443739 A 2/2017
CN 106646564 A 5/2017
(Continued)

OTHER PUBLICATIONS

International Search Report dated Mar. 4, 2019 for Parent PCT Appl. No. PCT/CN2018/117070.
(Continued)

*Primary Examiner* — Chuong P Nguyen
(74) *Attorney, Agent, or Firm* — James E. Walton

(57) ABSTRACT

The present application provides a fast and precise positioning method and system. The method includes: acquiring observation data of navigation satellites and LEO augmentation satellites at a current epoch; respectively acquiring navigation telegrams of the navigation satellites and the LEO augmentation satellites, and obtaining precise orbit and clock bias; correcting errors received in the positioning process according to the acquired navigation telegrams; normalizing by taking a type of satellite navigation system as reference to obtain unified linear observation equations, and calculating observation values of positioning and velocity measurement parameters; calculating estimated values of positioning and velocity measurement parameters at the
(Continued)

current epoch through a state equation according to the calculated observation values of positioning and velocity measurement parameters and estimated values of positioning and velocity measurement parameters at the previous epoch; generating and saving positioning and velocity measurement results at the current epoch according to the estimated values of positioning and velocity measurement parameters.

10 Claims, 3 Drawing Sheets

(51) Int. Cl.
  *G01S 19/52* (2010.01)
  *G01S 19/06* (2010.01)
  *G01S 19/07* (2010.01)
  *G01S 19/23* (2010.01)
  *H04B 7/195* (2006.01)
(52) U.S. Cl.
  CPC .............. *G01S 19/07* (2013.01); *G01S 19/23* (2013.01); *H04B 7/195* (2013.01)
(58) Field of Classification Search
  USPC ...... 342/352, 357.2, 357.23, 357.25, 357.35, 342/357.43, 357.44, 357.62
  See application file for complete search history.

(56) References Cited

U.S. PATENT DOCUMENTS

| | | | | |
|---|---|---|---|---|
| 6,560,536 | B1* | 5/2003 | Sullivan | G01S 5/0036 455/12.1 |
| 6,725,158 | B1* | 4/2004 | Sullivan | G01S 19/256 455/12.1 |
| 7,583,225 | B2* | 9/2009 | Cohen | H04B 7/1853 455/430 |
| 7,969,352 | B2* | 6/2011 | DiLellio | G01S 19/071 342/357.24 |
| 8,260,551 | B2* | 9/2012 | Janky | G01S 19/07 342/357.44 |
| 8,515,670 | B2* | 8/2013 | Janky | G01S 19/07 342/357.44 |
| 8,630,796 | B2* | 1/2014 | Sullivan | G01S 19/256 455/427 |
| 9,121,932 | B2* | 9/2015 | Janky | G01S 19/40 |
| 10,962,651 | B2* | 3/2021 | Liu | G01S 19/40 |
| 11,513,232 | B2* | 11/2022 | Reid | G01S 19/02 |
| 2004/0143392 | A1* | 7/2004 | Kilfeather | G01S 5/0036 701/469 |
| 2021/0208286 | A1* | 7/2021 | Turpin | G01S 3/74 |
| 2021/0223406 | A1* | 7/2021 | Mu | G01S 19/115 |
| 2021/0239855 | A1* | 8/2021 | Mu | G01S 19/073 |

FOREIGN PATENT DOCUMENTS

| | | |
|---|---|---|
| CN | 107153209 A | 9/2017 |
| CN | 107229061 A | 10/2017 |
| WO | 2015065541 A1 | 5/2015 |
| WO | 2015131064 A1 | 9/2015 |

OTHER PUBLICATIONS

Zhao, Yi et al. "PPP Augmentation and Real-Time Precise Orbit Determination for LEO Satellites" Proceedings of the 36th Chinese Control Conference, Jul. 28, 2017, pp. 5937-5941.

Ke, Mingxing et al. "Integrating GPS and LEO to Accelerate Convergence Time of Precise Point Positioning" 2015 International Conference on Wireless Communications & Signal Processing (WCSP), Oct. 17, 2015, pp. 1-5.

Office Action dated Dec. 30, 2022 from U.S. Appl. No. 15/734,341.

Amendment dated Mar. 22, 2023 from U.S. Appl. No. 15/734,341.

* cited by examiner

FAST AND PRECISE POSITIONING METHOD AND SYSTEM

CROSS REFERENCE TO RELATED APPLICATION

The present application claims the priority of the Chinese patent application filed with the Chinese Patent Office with application number 201810566043.4 on Jun. 4, 2018, and the entire contents of which are incorporated into the present application by reference.

TECHNICAL FIELD

The present application relates to satellite navigation technology, and for example to a fast and precise positioning method and system.

BACKGROUND

Global Navigation Satellite Systems (GLASS) include the US Global Positioning System (GPS), Russian GLONASS Global Navigation Satellite System (GLONASS), EU Galileo Positioning System (Galileo), China Beidou System, Japanese Quasi-Zenith Satellite System (QZSS) and Indian India Regional Navigation Satellite System (IRNSS), etc. The global satellite navigation system mainly determines the position, velocity and time (Position Velocity Time, PVT) of the moving carrier by using the principle of distance rear intersection through measuring the distance from the satellite to the receiver. The PVT performance of the satellite navigation systems is not only limited by the accuracy of satellite orbits and clock bias products, but also related to the accuracy of the error models of the ionosphere, troposphere and the like and the correctness of the ambiguity parameter fixation. However, the convergence velocity of orientation parameter solution for positioning, velocity measurement and timing mainly depends on the spatial geometric configurations of the navigation satellites. Currently, the precise positioning convergence process ranges from 15 minutes to 30 minutes, and the long convergence time cannot meet the requirements of high-precision real time positioning.

In order to reduce the convergence time, regional augmentation or joint solution of multiple navigation systems is currently mainly used. In regional augmentation systems, such as Real Time Kinematic (RTK), Real-Time extended (RTX), and Precise Point Positioning-Real Time Kinematic (PPP-RTK), error information of the ionosphere, troposphere and the like of the current region is solved by using regional reference stations, to correct the corresponding errors at the mobile station, so as to achieve a rapid separation of the ambiguity parameter and the position parameter, that is, the ambiguity parameter can be fixed within a few epochs, and positioning results in the order of centimeter and velocity measurement and timing results of a corresponding accuracy are achieved. By using multi-navigation satellite system, the number of observable satellites can be greatly increased, the spatial geometric configurations of the satellites can be improved, and the convergence velocity of parameter solutions can be accelerated, thereby improving the PVT performance.

However, all of the above methods have their limitations. For example, the regional augmentation system can only provide high-precision PVT services within a certain range, and the multi-navigation satellite system has a limited effect on accelerating the convergence of Precise Point Positioning (PPP).

SUMMARY OF THE INVENTION

The following is an overview of the subject matters described in detail herein. The present overview is not intended to limit the scope of protection of the claims.

The regional augmentation system is restricted by regions. Generally, it can only provide high-precision PVT services within a certain range. If the functioning scope is exceeded, the augmentation information is no longer available. Although the multi-navigation satellite system can improve its convergence velocity, because the relevant navigation satellites are located in medium-to-high orbits, and the angle swept by the satellites at the zenith in a short time is small, and the changes in the spatial geometric configurations of the satellites are not obvious, this method has a limited effect on accelerating the convergence of Precise Point Positioning, and its convergence time still needs at least 6 minutes in the case that the ambiguity is fixed. Considering that the LEO augmentation satellites move relatively fast relative to the ground monitoring station, it will lead to rapid geometric structure changes and rapid separation of the ambiguity parameters and the position parameters, thereby accelerating the convergence velocity of PVT. Therefore, an effective way to break through the bottleneck of the current high-precision PVT services is to combine the medium-, high-, low-orbit augmentation satellites for navigation services.

The present application proposes a positioning method and system based on navigation satellites and Low Earth Orbit (LEO) augmentation satellites, which use LEO augmentation satellite constellations to broadcast navigation satellite signals, thereby realizing large-scale rapid and high-precision PVT services by combining high-, middle-, low-orbit navigation satellites.

The present application adopts the following technical solutions:

The present application provides a fast and precise positioning method, which includes: a step 1 of acquiring observation data of navigation satellites and LEO augmentation satellites at a current epoch and preprocessing the observation data; a step 2 of respectively acquiring navigation telegrams of the navigation satellites and the LEO augmentation satellites, and obtaining precise orbit and clock bias of the navigation satellites and precise orbit and clock bias of the LEO augmentation satellites according to the acquired navigation telegrams of the LEO augmentation satellites; a step 3 of correcting errors received in the positioning process according to the acquired navigation telegrams; a step 4 of normalizing by taking a type of satellite navigation system as reference to obtain unified linear observation equations, and calculating observation values of positioning and velocity measurement parameters; a step 5 of obtaining estimated values of positioning and velocity measurement parameters at the current epoch through a state equation according to the calculated observation values of positioning and velocity measurement parameters and estimated values of positioning and velocity measurement parameters at the previous epoch; a step 6 of generating and saving positioning and velocity measurement results at the current epoch according to the estimated values of positioning and velocity measurement parameters at the current epoch and returning to the step 1.

Wherein the step 2 includes: collecting the state space representation SSR correction information in real time through the network to obtain high-precision real-time orbit and real-time clock bias.

Wherein if receiver clock bias $c\tilde{\delta t}_a^G$ corresponding to the global positioning system GPS is taken as reference, then the positioning observation equations of the satellite navigation systems other than the GPS are:

$$\rho_{LC,a}^{S,s} = R_{a,0}^{S,s} - l\Delta x_a - m\Delta y_a - n\Delta z_a + m_a^{S,s} T_a + c\tilde{\delta t}_a^G + (d_{\rho_{LC,a}}^S - d_{\rho_{LC,a}}^G)$$

$$\varphi_{i,a}^{S,s} = R_{a,0}^{S,s} - l\Delta x_a - m\Delta y_a - n\Delta z_a + m_a^{S,s} T_a + c\tilde{\delta t}_a^G + (d_{\rho_{LC,a}}^S - d_{\rho_{LC,a}}^G) + (d_{\phi_{LC}}^{S,s} - d_{\rho_{LC,a}}^S + d_{\phi_{LC,a}}^S - d_{\phi_{LC}}^{S,s}) + \lambda_{LC} N_{LC,a}^{S,s}$$

$$\rho_{LC,a}^{S,s} = R_{a,0}^{S,s} - l\Delta x_a - m\Delta y_a - n\Delta z_a + m_a^{S,s} T_a + c\tilde{\delta t}_a^G + (d_{\rho_{LC,a}}^S - d_{\rho_{LC,a}}^G)$$

in the equations, $m_a^{S,s}$ is a mapping function corresponding to a tropospheric delay parameter in a zenith direction of a monitoring station in a GNSS system, $T_a$ is the tropospheric delay parameter in the zenith direction of the monitoring station, $-\rho_{LC,a}^{S,s}$ and $\phi_{LC,a}^{S,s}$ are respectively pseudo-range and phase observation values of ionosphere-free combination, $d_{\rho_{LC,a}}^s$ and $d_{\phi_{LC,a}}^s$ are respectively hardware delays of the pseudo-range and phase observation values of ionosphere-free combination at the receiver side, $d_{\rho_{LC}}^{S,s}$ and $d_{\phi_{LC}}^{S,s}$ are respectively hardware delays of the pseudo-range and phase observation values of ionosphere-free combination at the satellite side;

$$\lambda_{LC} = \frac{c}{f_1 + f_2}$$

is the wavelength of the observation values of ionosphere-free combination c is a velocity of light in vacuum, $f_i$ is a carrier frequency at frequency point 1, $f_2$ is the carrier frequency at frequency point 2, $N_{LC,a}^{S,s}$ is the corresponding integer ambiguity parameter, and in the equations, $d_{\rho_{LC,a}}^S - d_{\rho_{LC,a}}^G$ is the difference between the hardware delays of the pseudo-range at the receiver side of the GPS and any of the satellite navigation systems other than the GPS, that is, the code bias; $R_{a,0}^{S,s} R_{a,0}^{S,a}$ is the distance between station and satellite calculated according to the initial coordinates of the station and satellite, $-l$, m and n are linearization coefficients, and respectively $$\frac{x^s - x_a}{\sqrt{(x^s - x_a)^2 + (y^s - y_a)^2 + (z^s - z_a)^2}},$$

$$\frac{y^s - y_a}{\sqrt{(x^s - x_a)^2 + (y^s - y_a)^2 + (z^s - z_a)^2}},$$

$$\frac{z^s - z_a}{\sqrt{(x^s - x_a)^2 + (y^s - y_a)^2 + (z^s - z_a)^2}}, x^s, y^s$$

and $z^s$ are the coordinates of the satellite, $x_a$, $y_a$ and $z_a$ are the initial coordinates of the monitoring station, and $\Delta x_a$, $\Delta y_a$, and $\Delta z_a$ are respectively correction values thereof.

Wherein the observation equation is:

$$\dot{\phi}_{i,a}^{S,s} = l(\dot{x}_a - \dot{x}^S) + m(\dot{y}_a - \dot{y}^S) + n(\dot{z}_a - \dot{z}^S) + m_a^{S,s} \dot{T}_a + c\dot{\delta t}_a$$

$$\dot{\phi}_{i,a}^{S,s} = \frac{\phi_{i,a}^{S,s}(k+1) - \phi_{i,a}^{S,s}(k-1)}{2\Delta t}$$

$$\dot{\phi}_{i,a}^{S,s} = l(\dot{x}_a - \dot{x}^S) + m(\dot{x}_a - \dot{x}^S) + n(\dot{x}_a - \dot{x}^S) + m_a^{S,s} \dot{T}_a + c\dot{\delta t}_a$$

in the equation, $\dot{\phi}_{i,a}^{S,s}$ denotes the rate of phase change between the monitoring station and the satellite in the unit of cycle/s, $\Delta t$ denotes the sampling interval, and $\dot{x}^s$, $\dot{y}^s$ and $\dot{z}^s$ are the rates of the satellite, $\dot{x}_a$, $\dot{y}_a$ and $\dot{z}_a$ are the rates of the monitoring station, $\dot{\delta t}_a$ denotes the receiver clock velocity, $\dot{T}_a$ denotes the rate of change of the troposphere.

Wherein the navigation satellites comprise at least one of the US Global Positioning System GPS, China Beidou, EU Galileo, and Russian GLONASS satellite navigation systems.

The present application provides a positioning system, which includes: a atellite observation data receiving and processing apparatus configured for acquiring observation data of navigation satellites and LEO augmentation satellites at each epoch and preprocessing the observation data; a satellite navigation telegram receiving and processing apparatus configured for respectively acquiring navigation telegrams of the navigation satellites and the LEO augmentation satellites at each epoch, and obtaining precise orbit and clock bias of the navigation satellites and precise orbit and clock bias of the LEO augmentation satellites according to the acquired navigation telegrams of the LEO augmentation satellites; a positioning error correcting apparatus configured for correcting errors received in the positioning process according to the acquired navigation telegrams; a positioning and velocity measurement parameter observation value calculating apparatus configured for normalizing by taking a type of satellite navigation system as reference to obtain unified linear observation equations, and calculating observation values of positioning and velocity measurement parameters; a positioning and velocity measurement parameter estimated value calculating apparatus configured for obtaining estimated values of positioning and velocity measurement parameters through a state equation according to the calculated observation values of positioning and velocity measurement parameters and the saved estimated values of positioning and velocity measurement parameters at the previous epoch.

A positioning and velocity measurement result saving apparatus is configured for generating and saving positioning and velocity measurement results at the current epoch according to the estimated values of positioning and velocity measurement parameters at the current epoch.

Wherein the satellite navigation telegram receiving and processing apparatus comprises a navigation satellite navigation telegram receiving and processing unit and a LEO augmentation satellite navigation telegram receiving and processing unit.

Wherein the positioning error correcting apparatus comprises a navigation satellite error correcting unit and a LEO augmentation satellite error correcting unit.

Wherein if receiver clock bias $c\tilde{\delta t}_a^G$ corresponding to the global positioning system GPS is taken as reference, then the positioning observation equations of the satellite navigation systems other than the GPS are:

$$\rho_{LC,a}^{S,s} = R_{a,0}^{S,s} - l\Delta x_a - m\Delta y_a - n\Delta z_a + m_a^{S,s} T_a + c\tilde{\delta t}_a^G + (d_{\rho_{LC,a}}^S - d_{\rho_{LC,a}}^G)$$

$$\varphi_{i,a}^{S,s} = R_{a,0}^{S,s} - l\Delta x_a - m\Delta y_a - n\Delta z_a + m_a^{S,s} T_a + c\tilde{\delta t}_a^G + (d_{\rho_{LC,a}}^S - d_{\rho_{LC,a}}^G) + (d_{\phi_{LC}}^{S,s} - d_{\rho_{LC,a}}^S + d_{\phi_{LC,a}}^S - d_{\phi_{LC}}^{S,s}) + \lambda_{LC} N_{LC,a}^{S,s}$$

$$\rho_{LC,a}^{S,s} = R_{a,0}^{S,s} - l\Delta x_a - m\Delta y_a - n\Delta z_a + m_a^{S,s} T_a + c\tilde{\delta t}_a^G + (d_{\rho_{LC,a}}^S - d_{\rho_{LC,a}}^G)$$

wherein $m_a^{S,s}$ is a mapping function corresponding to a tropospheric delay parameter in a zenith direction of a monitoring station in a GNSS system, $T_a$ is the tropospheric delay parameter in the zenith direction of the monitoring station, $-\rho_{LC,a}^{S,s}$ and $\phi_{LC,a}^{S,s}$ are respectively pseudo-range and phase observation values of ionosphere-free combination, $d_{\rho_{LC},a}^{s}$ and $d_{\phi_{LC},a}^{s}$ are respectively hardware delays of the pseudo-range and phase observation values of ionosphere-free combination at the receiver side, $d_{\rho_{LC}}^{S,s}$ and $d_{\phi_{LC}}^{S,s}$ are respectively hardware delays of the pseudo-range and phase phase observation values of ionosphere-free combination at the satellite side;

$$\lambda_{LC} = \frac{c}{f_1 + f_2}$$

is the wavelength of the observation values of ionosphere-free combination, c is a velocity of light in vacuum, $f_1$ is a carrier frequency at frequency point 1, $f_2$ is the carrier frequency at frequency point 2, $N_{LC,a}^{S,s}$ is the corresponding integer ambiguity parameter, and in the equations, $d_{\rho_{LC,a}}^{S} - d_{\rho_{LC,a}}^{G}$ is the difference between the hardware delays of the pseudo-range at the receiver side of the GPS and any of the satellite navigation systems other than the GPS, that is, the code bias; $R_{a,0}^{S,s}$ $R_{a,0}^{S,a}$ is the distance between station and satellite calculated according to the initial coordinates of the station and satellite, l, m and n are linearization coefficients, and are respectively $$\frac{x^s - x_a}{\sqrt{(x^s - x_a)^2 + (y^s - y_a)^2 + (z^s - z_a)^2}},$$

$$\frac{y^s - y_a}{\sqrt{(x^s - x_a)^2 + (y^s - y_a)^2 + (z^s - z_a)^2}},$$

$$\frac{z^s - z_a}{\sqrt{(x^s - x_a)^2 + (y^s - y_a)^2 + (z^s - z_a)^2}},$$

$x^s$, $y^s$ and $z^s$ are the coordinates of the satellite, $x_a$, $y_a$ and $z_a$ are the initial coordinates of the monitoring station, and $\Delta x_a$, $\Delta y_a$ and $\Delta z_a$ respectively are respectively correction values thereof.

Wherein the velocity measurement observation equation is:

$$\dot{\phi}_{i,a}^{S,s} = l(\dot{x}_a - \dot{x}^S) + m(\dot{y}_a - \dot{y}^S) + n(\dot{z}_a - \dot{z}^S) + m_a^{S,s}\dot{T}_a + c\dot{\delta t}_a$$

$$\dot{\phi}_{i,a}^{S,s} = \frac{\phi_{i,a}^{S,s}(k+1) - \phi_{i,a}^{S,s}(k-1)}{2\Delta t}$$

$$\dot{\phi}_{i,a}^{S,s} = l(\dot{x}_a - \dot{x}^S) + m(\dot{x}_a - \dot{x}^S) + n(\dot{x}_a - \dot{x}^S) + m_a^{S,s}\dot{T}_a + c\dot{\delta t}_a$$

in the equation, $\dot{\phi}_{i,a}^{S,s}$ denotes the rate of phase change between the monitoring station and the satellite in the unit of cycle/s, $\Delta t$ denotes the sampling interval, and $\dot{x}^s$, $\dot{y}^s$ and $\dot{z}^s$ are the rates of the satellite, $\dot{x}_a$, $\dot{y}_a$ and $\dot{z}_a$ are the rates of the monitoring station, $\dot{\delta t}_a$ denotes the receiver clock velocity, $\dot{T}_a$ denotes the rate of change of the troposphere.

An embodiment of the present application provides a non-transitory computer-readable storage medium, which includes a stored program, wherein the positioning method as described in any one of the above is executed when the program is running.

An embodiment of the present application provides a processor, which is configured to run a program, and the positioning method as described in any one of the above is executed when the program is running.

After reading and understanding the drawings and the detailed description, other aspects can be understood.

BRIEF DESCRIPTION OF THE DRAWINGS

The drawings are only used to illustrate example embodiments, and are not considered as limitation to the present application. And throughout the drawings, the same reference symbols are used to denote the same components.

In the drawings.

DETAILED DESCRIPTION OF THE PREFERRED EMBODIMENT

Figure 1:
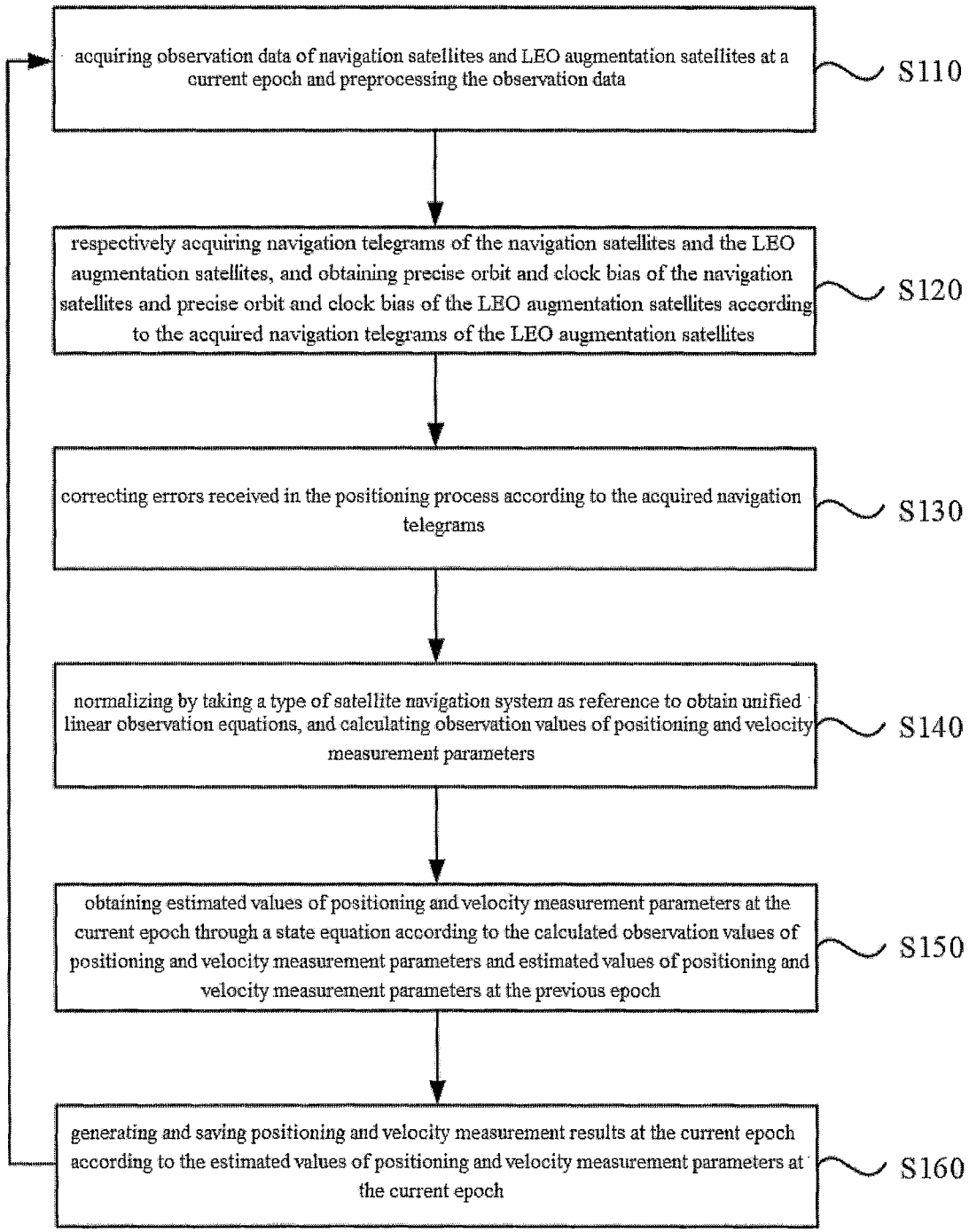
FIG. 1 is a flowchart of a fast and precise positioning method according to an embodiment of the present application.

Hereinafter, exemplary embodiments of the present disclosure will be described in more detail with reference to the accompanying drawings. Although the drawings show exemplary embodiments of the present disclosure, it should be understood that the present disclosure can be implemented in various forms and should not be limited by the embodiments set forth herein.

I. Unified Linear Observation Equations of Medium-, High-, Low-Orbit Augmentation Satellites Obtained by Normalizing by Taking a Type of Satellite Navigation System as Reference To implement the positioning method provided by the present application, it is first necessary to construct and linearize unified observation equations for the medium-, high-, low-orbit augmentation satellites, and the receiver obtains the observation values of positioning and velocity measurement parameters according to the constructed linear observation equations. Wherein multi-frequency information sources of the medium-, high-, low-orbit constellation include multi-frequency information sources of at least one of all existing satellite navigation systems and the LEO augmentation satellite navigation system. The navigation satellites and the LEO augmentation satellites have the same positioning methods, and observation values of the two can be put together for adjustment solution. The mathematical model of the observation equations themself is a nonlinear equation, so it is necessary to perform Taylor expansion of the equation, and a linear equation can be obtained after discarding the second-order terms. The observation values of the navigation satellites and the LEO augmentation satellites can be expressed as a linear equation system of the positions and the receiver clock biases. Using differential observation values, the observation equations related to the monitoring station velocity term and the rate of change of the receiver clock biases can be obtained. By combining these two types of observation equations, the optimal estimation of the three parameters of PVT can be obtained.

The basic observation values of the navigation satellites acquired by the receiver from navigation telegrams include two type of pseudo-ranges ρ and carrier phases φ at multiple frequency points. The observation values of the pseudo-range and phase from the satellite s to the monitoring station a at the frequency point i can be expressed as:

$$\rho_{i,a}^s = R_a^s + m_a^s T_a + c\delta t_a - c\delta t^s + \gamma_i I_a^s + d_{\rho_i,a} - d_{\rho_i}^s$$

$$\phi_{i,a}^s = R_a^s + m_a^s T_a + c\delta t_a - c\delta t^s + \gamma_i I_a^s + d_{\phi_i,a} - d_{\phi_i}^s + \lambda_i N_{i,a}^s \quad (1)$$

wherein $R_a^s$ is the geometric distance between the satellite and the monitoring station, $T_a$ is the tropospheric delay parameter in the zenith direction of the monitoring station, the mapping function corresponding to $T_a$ is $m_a^s$, c is the velocity of light in vacuum, $\delta t^s$ and $\delta t_a$ are respectively the satellite clock bias and the receiver clock bias, $$\gamma_i = \frac{f_1^2}{f_i^2},$$

in which $f_i$ is the carrier frequency at the frequency point i, the wavelength corresponding to $f_i$ is $$\lambda_i = \frac{c}{f_i},$$

$I_a^s$ is the oblique ionospheric delay, $d_{\rho_i,a}$ and $d_{\phi_i,a}$ are respectively the hardware delays of the pseudo-range and the carrier phase at the receiver side, $d_{\rho_i}^s$ and $d_{\phi_i}^s$ are the hardware delays of the pseudo-range and the carrier phase at the satellite side, $N_{i,a}^s$ is the integer ambiguity parameter. In the above equation, error corrections such as antenna phase deviation and variation, phase Wind-Up, and relativistic effect of satellite clock bias, and errors such as multipath and observation value noises are ignored.

In the equation (1), the zenith tropospheric delay parameter $T_a$ and the receiver clock bias $\delta t_a$ are only related to the monitoring station, the satellite clock bias $\delta t^s$ is only related to the satellite, the oblique ionospheric delay parameter $I_a^s$ is related to the monitoring station and the satellite, and the hardware delay parameters of the pseudo-range and phase at the satellite side or the receiver side are mainly related to the monitoring station, the satellite, types of observation values, tracking frequency and the like, respectively.

In navigation satellite data processing, different types of combinations of phase and pseudo-range observation values are often constructed as needed, wherein because the influence of the first-order ionosphere is eliminated in the ionosphere-free combination, it is widely used to construct observation equations for high-precision data processing. The observation equation can be expressed as:

$$\rho_{LC,a}^s = $$

$$\frac{f_1^2}{f_1^2 - f_2^2}\rho_{1,a}^s - \frac{f_2^2}{f_1^2 - f_2^2}\rho_{2,a}^s = R_a^s + m_a^s T_a + c\delta t_a - c\delta t^s + d_{\rho_{LC},a} - d_{\rho_{LC}}^s$$

$$\phi_{LC,a}^s = \frac{f_1^2}{f_1^2 - f_2^2}\phi_{1,a}^s - \frac{f_2^2}{f_1^2 - f_2^2}\phi_{2,a}^s = $$

$$R_a^s + m_a^s T_a + c\delta t_a - c\delta t^s + d_{\phi_{LC},a} - d_{\phi_{LC}}^s + \lambda_{LC} N_{LC,a}^s.$$

wherein $\rho_{LC,a}^s$ and $\phi_{LC,a}^s$ are respectively pseudo-range and phase observation values of the ionosphere-free combination, $d_{\rho_{LC},a}$ and $d_{\phi_{LC},a}$ are respectively the hardware delays of the pseudo-range and phase observation values of the ionosphere-free combination at the receiver side, the values of which are:

$$d_{\rho_{LC},a} = \frac{f_1^2}{f_1^2 - f_2^2}d_{\rho_1,a} - \frac{f_2^2}{f_1^2 - f_2^2}d_{\rho_2,a} \quad (3)$$

$$d_{\phi_{LC},a} = \frac{f_1^2}{f_1^2 - f_2^2}d_{\phi_1,a} - \frac{f_2^2}{f_1^2 - f_2^2}d_{\phi_2,a}$$

The hardware delays $d_{\rho_{LC}}^s$ and $d_{\phi_{LC}}^s$ of the pseudo-range and phase observation values of the ionosphere-free combination at the satellite side are respectively:

$$d_{\rho_{LC}}^s = \frac{f_1^2}{f_1^2 - f_2^2}d_{\rho_1}^s - \frac{f_2^2}{f_1^2 - f_2^2}d_{\rho_2}^s \quad (4)$$

$$d_{\phi_{LC}}^s = \frac{f_1^2}{f_1^2 - f_2^2}d_{\phi_1}^s - \frac{f_2^2}{f_1^2 - f_2^2}d_{\phi_2}^s$$

wherein $$\lambda_{LC} = \frac{c}{f_1 + f_2}$$

is the wavelength of the observation values of ionosphere-free combination, $N_{LC,a}^s$ the corresponding integer ambiguity parameter, the value of which is:

$$N_{LC,a}^s = N_{1,a}^s + \frac{f_2}{f_1 - f_2}(N_{1,a}^s - N_{2,a}^s) \quad (5)$$

Taking into account the correlation of each parameter in the equation (2) with the monitoring stations, the satellites and the signal frequencies, etc., for multi-system observations, the equation (2) can be extended to:

$$\rho_{LC,a}^{S,s} = R_a^{S,s} + m_a^{S,s} T_a + c\delta t_a - c\delta t^{S,s} + d_{\rho_{LC},a}^s - d_{\rho_{LC}}^{S,s}$$

$$\phi_{LC,a}^{S,s} = R_a^{S,s} + m_a^{S,s} T_a + c\delta t_a - c\delta t^{S,s} + d_{\phi_{LC},a}^s - d_{\rho_{LC}}^{S,s} + \lambda_{LC} N_{LC,a}^{S,s}$$

$$\rho_{LC,a}^{S,s} = R_a^{S,s} + m_a^{S,s} T_a + c\delta t_a - c\delta t^{S,s} + d_{\rho_{LC},a}^s - d_{\rho_{LC}}^{S,s}$$

$$\phi_{i,a}^{S,s} = R_a^{S,s} + m_a^{S,s} T_a + c\delta t_a - c\delta t^{S,s} + d_{\phi_{LC},a}^s - d_{\rho_{LC}}^{S,s} + \lambda_{LC} N_{LC,a}^{S,s} \quad (6)$$

wherein S denotes the GNSS system. For GPS, Galileo, QZSS and Beidou navigation satellite systems and the like that use code division multiple access technology, the carrier frequencies of different satellites thereof are the same, so the hardware delays of the pseudo-range and carrier phase observation values at the receiver side are the same for all single-system satellites. However, because the GLONASS system uses frequency division multiple access technology, its corresponding hardware delays of the pseudo-range and phase at the receiver side are also related to the satellite (frequency), and different GLONASS satellites (frequency) correspond to different hardware delays at the receiver side.

Since in the PVT model, the clock biases of the navigation satellites are the same and they will absorb the hardware delay $d_{\rho_{LC}}^s$ of the pseudo-range at the satellite side during estimation, and the hardware delay of the pseudo-range $d_{\rho_{LC,a}}$ at the receiver side will be absorbed by the receiver clock bias, the observation equations at this time are:

$$\rho_{LC,a}^{S,s} = R_a^{S,s} + m_a^{S,s} T_a + c\tilde{\delta t}_a^{S}$$

$$\phi_{LC,a}^{S,s} = R_a^{S,s} + m_a^{S,s} T_a + c\tilde{\delta t}_a^{S} + (d_{\rho_{LC}}^{S,s} - d\rho_{LC,a}^{s}) + d_{\phi_{LC,a}}^{s} - d\phi_{LC}^{S,s}) + \lambda_{LC} N_{LC,a}^{S,s}$$

$$\rho_{LC,a}^{S,s} = R_a^{S,s} + m_a^{S,s} T_a + c\tilde{\delta t}_a^{S} \quad (7)$$

wherein $c\tilde{\delta t}_a = c\tilde{\delta t}_a + d_{\rho_{LC,a}}$. When the multi-mode navigation system is processed in combination, generally only one receiver clock bias parameter is estimated, but the foregoing indicates that the receiver clock bias parameter will absorb the hardware delay of the observation value of the pseudo-range at the receiver side, and this delay parameter is related to the signal frequency and the navigation system, which thus results in that different systems correspond to different receiver clock biases $c\tilde{\delta t}_a$. If the receiver clock bias $c\tilde{\delta t}_a^G$ corresponding to the GPS system is taken as reference, the observation equations of other systems can be rewritten as:

$$\rho_{LC,a}^{S,s} = R_a^{S,s} + m_a^{S,s} T_a + c\tilde{\delta t}_a^{G} + (d_{\rho_{LC}}^{s} - d_{\rho_{LC,a}}^{G})$$

$$\phi_{LC,a}^{S,s} = R_a^{S,s} + m_a^{S,s} T_a + c\tilde{\delta t}_a^{G} + (d_{\rho_{LC,a}}^{s} - d_{\rho_{LC,a}}^{G}) + (d_{\rho_{LC}}^{S,s} - d_{\rho_{LC,a}}^{s} + d_{\phi_{LC,a}}^{s} - d_{\phi_{LC,a}}^{G}) + \lambda_{LC} \tilde{N}_{LC,a}^{S,s}$$

$$\rho_{LC,a}^{S,s} = R_a^{S,s} + m_a^{S,s} T_a + c\tilde{\delta t}_a^{G} + (d_{\rho_{LC,a}}^{s} - d_{\rho_{LC,a}}^{G}) \quad (8)$$

wherein $d_{\rho_{LC,a}}^{s} - d_{\rho_{LC,a}}^{G}$ is the difference between the hardware delays of the pseudo-range at the receiver side of the GPS and any of the satellite navigation systems other than the GPS, that is, the code bias. If considering the difference of the time references between the different navigation systems, it is necessary to introduce an additional constant bias parameter. This constant bias parameter and the Differential Code Bias (DCB) parameter will constitute the Inter-System Bias (ISB) parameter. For navigation systems using code division multiple access, all satellites thereof correspond to the same ISB parameters, and because the GLONASS system uses frequency division multiple access technology, different satellites (frequencies) thereof correspond to different ISB parameters, and at this time the ISB parameters are actually the combination of different inter-system code biases, time reference differences and Inter-Frequency Biases (IFB) of different satellites in the GLONASS system. As a satellite navigation system, the LEO augmentation satellite constellation has the same positioning mathematical model as the related GNSS system. The LEO augmentation satellite navigation system can be regarded as a new navigation system, and only needs to estimate additional ISB parameters.

The GNSS observation equation itself is a nonlinear equation, and related parameter estimation methods are generally applicable to linear systems, so it needs to be Taylor expanded. The GNSS observation equation is expanded at the approximate coordinates of the monitoring station according to the Taylor's formula, and its second-order terms are discarded, so that linear expressions about position and time are obtained as follows:

$$\rho_{LC,a}^{S,s} = R_{a,0}^{S,s} - l\Delta x_a - m\Delta y_a - n\Delta z_a + m_a^{S,s} T_a + c\tilde{\delta t}_a^{G} + (d_{\rho_{LC,a}}^{s} - d_{\rho_{LC,a}}^{G})$$

$$\phi_{LC,a}^{S,s} = R_{a,0}^{S,s} - l\Delta x_a - m\Delta y_a - n\Delta z_a + m_a^{S,s} T_a + c\tilde{\delta t}_a^{G} + (d_{\rho_{LC,a}}^{s} - d_{\rho_{LC,a}}^{G}) + (d_{\rho_{LC}}^{S,s} - d_{\rho_{LC,a}}^{s} + d_{\phi_{LC,a}}^{s} - d_{\phi_{LC}}^{S,s}) + \lambda_{LC} N_{LC,a}^{S,s}$$

$$\rho_{LC,a}^{S,s} = R_a^{S,s} + m_a^{S,s} T_a + c\tilde{\delta t}_a^{G} + (d_{\rho_{LC,a}}^{s} - d_{\rho_{LC,a}}^{G}) \quad (9)$$

wherein $R_{a,0}^{S,s}$ is the distance between station and satellite calculated according to the initial coordinates of the station and satellite, l, m and n are linearization coefficients, and are respectively $$\frac{x^s - x_a}{\sqrt{(x^s - x_a)^2 + (y^s - y_a)^2 + (z^s - z_a)^2}},$$

$$\frac{y^s - y_a}{\sqrt{(x^s - x_a)^2 + (y^s - y_a)^2 + (z^s - z_a)^2}},$$

$$\frac{z^s - z_a}{\sqrt{(x^s - x_a)^2 + (y^s - y_a)^2 + (z^s - z_a)^2}},$$

and $x^s$, $y^s$ and $z^s$ are the coordinates of the satellite, $x_a$, $y_a$ and $z_a$ are the initial coordinates of the monitoring station, $\Delta x_a$, $\Delta y_a$ and $\Delta z_a$ respectively are respectively correction values thereof.

In the equation (9), only the timing and positioning functions are completed, and the velocity measurement observation equation is:

$$\dot{\phi}_{i,a}^{S,s} = l(\dot{x}_a - \dot{x}^S) + m(\dot{x}_a - \dot{x}^S) + n(\dot{x}_a - \dot{x}^S) + m_a^{S,s} \dot{T}_a + c\dot{\tilde{\delta t}}_a \quad (10)$$

$$\dot{\phi}_a^{S,s} = \frac{\phi_a^{S,s}(k+1) - \phi_a^{S,s}(k-1)}{2\Delta t}$$

wherein $\dot{\phi}_{i,s}^{S,s}$; denotes the rate of phase change between the monitoring station and the satellite in the unit of cycle/s, $\Delta t$ denotes the sampling interval, and is $\dot{x}^s$, $\dot{y}^s$ and $\dot{z}^s$ are the rates of the satellite, $\dot{x}_a$, $\dot{y}_a$ and $\dot{z}_a$ are the rates of the monitoring station, $\dot{\tilde{\delta t}}_a$ denotes the receiver clock velocity, $\dot{T}_a$ denotes the rate of change of the troposphere.

II. Constructing Positioning and Velocity Measurement Parameter State Equation with Root-Mean-Square Filtering Algorithm After establishing position and time observation equations and velocity observation equations, the root-mean-square filtering algorithm is used to perform state estimation on the positioning and velocity measurement parameters. Due to the addition of the LEO augmentation satellite observation values, the rapid convergence of the PPP can be realized and parameters information with higher precision can be obtained.

The main steps of root-mean-square information filtering will be given below, and its state equation is:

$$x_k = \Phi(t_k, t_{k-1}) x_{k-1} + \Gamma(t_k, t_{k-1}) u_{k-1}$$

wherein $x_{k-1}$ has priori value $\bar{x}_{k-1}$ and priori variance $\bar{P}_{k-1}$, and is the position, velocity or clock bias parameter to be estimated. The square root of the priori variance (Cholesky decomposition) is calculated to construct a virtual observation equation:

$$\bar{b}_{k-1} = \bar{R}_{k-1} \bar{x}_{k-1}$$

wherein $\bar{x}_{k-1} = x_{k-1} + \eta_{k-1}$, $E[\eta_{k-1}] = 0$, $E[\eta_{k-1} \eta_{k-1}^T] = \bar{P}_{k-1} = \bar{R}_{k-1}^{-1} \bar{R}_{k-1}^{-T}$. And in the original equation:

$$\bar{u}_{k-1} = u_{k-1} + \alpha_{k-1}$$

$E[\alpha_{k-1}] = 0$, $E[\alpha_{k-1} \alpha_{k-1}^T] = Q$, thereby constructing the virtual observation equation of state noise:

$$\bar{b}_{u_{k-1}} = R_u \bar{u}_{k-1} = R_u u_{k-1} + \bar{\alpha}_{k-1}.$$

The flitering observation equation is:

$y_{k-1} = H_{k-1}x + \varepsilon_{k-1}$ wherein $E[\varepsilon]=0$, $E(\varepsilon\varepsilon^T)=I$.

According to the minimum variance criterion, the observation update function of the root-mean-square information filtering algorithm can be constructed:

$\hat{J}_{k-1} = \|\bar{R}_{k-1}x_{k-1} - \bar{b}_{k-1}\|^2 + (H_{k-1}x_{k-1} - y_{k-1})^2 + \|R_u u_{k-1} - \bar{b}_{u_{k-1}}\|^2$, If it is written in matrix form, then:

$$\hat{J}_{k-1} = \left\| \begin{bmatrix} \bar{R}_{k-1} \\ H_{k-1} \end{bmatrix} x_{k-1} - \begin{bmatrix} \bar{b}_{k-1} \\ y_{k-1} \end{bmatrix} \right\|^2 + \|R_u u_{k-1} - \bar{b}_{u_{k-1}}\|^2,$$

By orthogonally changing the above equation, the following can be obtained:

$$\hat{J}_{k-1} = \left\| \begin{bmatrix} \hat{R}_{k-1} \\ 0 \end{bmatrix} x_{k-1} - \begin{bmatrix} \hat{b}_{k-1} \\ e_{k-1} \end{bmatrix} \right\|^2 + \|R_u u_{k-1} - \bar{b}_{u_{k-1}}\|^2.$$

It is also possible to construct the state update function of the root-mean-square information filtering algorithm according to the minimum variance criterion:

$\bar{J}_k = (e_{k-1})^2 \|\hat{R}_{k-1}\Phi^{-1}(t_k, t_{k-1})(x_k - \Gamma(t_k, t_{k-1})u_{k-1}) - \hat{b}_{k-1}\|^2 + \|R_u u_{k-1} - \bar{b}_{u_{k-1}}\|^2$ If it is written in matrix form, then:

$$\bar{J}_k = (e_{k-1})^2 + \left\| \begin{bmatrix} R_u & 0 \\ -\tilde{R}_k\Gamma(t_k, t_{k-1}) & \tilde{R}_k \end{bmatrix} \begin{bmatrix} u_{k-1} \\ x_k \end{bmatrix} - \begin{bmatrix} \bar{b}_{u_{k-1}} \\ \hat{b}_{k-1} \end{bmatrix} \right\|$$

wherein $\tilde{R}_k = \hat{R}_{k-1}\Phi^{-1}(t_k, t_{k-1})$, and by orthogonally transforming, the following can be obtained:

$$\bar{J}_k = (e_{k-1})^2 + \left\| \begin{bmatrix} \bar{R}_{u_k} & \bar{R}_{ux_k} \\ 0 & \bar{R}_k \end{bmatrix} \begin{bmatrix} u_{k-1} \\ x_k \end{bmatrix} - \begin{bmatrix} \bar{b}_{u_{k-1}} \\ \bar{b}_{k-1} \end{bmatrix} \right\|. \quad (11)$$

When using medium and high orbit information sources to solve positioning and velocity measurement parameters, due to the limitations of the satellite constellation, the accuracy of the solution and the convergence time often cannot meet the requirements of fast and high-precision positioning. The use of medium-, high-, low-orbit multi-frequency information source fusion positioning can augment the geometric structure of the visible satellites, achieve rapid convergence, and thereby improve the accuracy of positioning solution. FIG. 1 shows a flowchart of a positioning method according to an embodiment of the present application. The method may be executed by a positioning system which may be implemented in at least one of software and hardware. Wherein the medium-, high-, low-orbit constellation multi-frequency information sources include the multi-frequency information sources of at least one of all existing satellite navigation systems and the LEO augmentation satellite navigation system. As shown in FIG. 1, the positioning method according to an embodiment of the present application includes a step S110 to a step S160.

In the step S110, observation data of navigation satellites and LEO augmentation satellites are acquired at a current epoch and preprocessed. The process is as follows: acquiring multi-system multi-band observation values and LEO augmentation satellite observation values through receiver tracking and observations, and preprocessing the data.

Wherein the navigation satellites include at least one of the US GPS, China Beidou, EU Galileo, and Russian GLONASS satellite navigation systems.

In the step S120, navigation telegrams of the navigation satellites and the LEO augmentation satellites are acquired, and precise orbits and clock biases of the navigation satellites and of the LEO augmentation satellites are obtained at the same time according to the acquired navigation telegrams of the LEO augmentation satellites. The process is: acquiring the navigation telegrams of the navigation satellites and the LEO augmentation satellites, and using the number of orbits and the clock bias coefficients provided by the navigation telegrams to interpolate to obtain the satellite position and the satellite clock bias at the current time point. Wherein because the LEO augmentation satellites have different characteristics from the navigation satellites, the navigation telegrams of the LEO augmentation satellites are different from the navigation telegrams of the navigation satellites. For example, the navigation telegrams of the LEO augmentation satellites have more types of parameters. Therefore, the calculation of the orbits and clock biases of the LEO augmentation satellites is also different from the calculation of the orbits and clock biases of the navigation satellites. For example, compared with the calculation of the orbits of the navigation satellites, in the calculation of the orbits of the LEO augmentation satellites, more perturbation factors need to be considered. Because the accuracy of the orbits and satellite clock biases of the LEO augmentation satellites and the navigation satellites given by the broadcast ephemeris generally cannot meet the high-precision positioning requirements. In an embodiment, in order to obtain real-time orbits and real-time clock biases with high precision, State Space Representation (SSR) correction information can be received in real time through the network.

In the step S130, errors received in the positioning process are corrected according to the acquired navigation telegrams.

Errors that can be corrected by the error model are corrected in the step 130, and then errors that cannot be corrected by the error model are corrected through the calculation of the positioning and velocity measurement parameter observation values in the step S140 and the estimation of the positioning and velocity measurement parameters in the step S150. For the LEO augmentation satellites and the navigation satellites, some errors are different, and the errors need to be corrected correspondingly according to different satellite navigation systems.

In the positioning process, the positioning result is often affected by multiple terms of errors, and weakening each error is the basis for obtaining high-precision positioning results. According to the correlation, these errors can be divided into errors related to the monitoring stations, errors related to the satellites, and errors related to satellite signal propagation. The commonly used methods to weaken the positioning errors include model correction and parameter estimation. For some error terms, the physical characteristics of which has been understood, their effects can be accurately eliminated by using correction formulas, such as relativistic effects, earth rotation effects, etc.; for some error terms that can be fitted with a model, their effects can be eliminated by using model values obtained by the fitting model, such as solid earth tide correction, tropospheric correction, etc.; and for some other error terms with unknown physical characteristics and poor model fitting, parameter estimation methods can be used to eliminate their impact on positioning, such as receiver clock biases, etc.:

In the step S140, observation values of positioning and velocity measurement parameters are calculated according to unified linear observation equations obtained by normalizing by taking a type of satellite navigation system as reference. The process is as follows: according to the obtained observation data and navigation telegrams, the position of the receiver through the above formula (9) is calculated, and the clock bias of the receiver can also be calculated at the same time; the velocity of the receiver can also be calculated through the above formula (10).

In the step S150, according to the calculated observation values of positioning and velocity measurement parameters and estimated values of positioning and velocity measurement parameters at the previous epoch, estimating positioning and velocity measurement parameters at the present epoch through a state equation, to obtain estimated values of positioning and velocity measurement parameters at the current epoch. The process is as follows: according to the calculated observation values of positioning and velocity measurement parameters and estimated values of positioning and velocity measurement parameters at the previous epoch, calculating estimated values of positioning and velocity measurement parameters at the present epoch through the above formula (11), and saving the calculated estimated values of positioning and velocity measurement parameters.

In the step S160, according to the estimated values of positioning and velocity measurement parameters at the current epoch, positioning and velocity measurement results at the current epoch are generated and saved, and the processing returns to the step S110.

Figure 2:
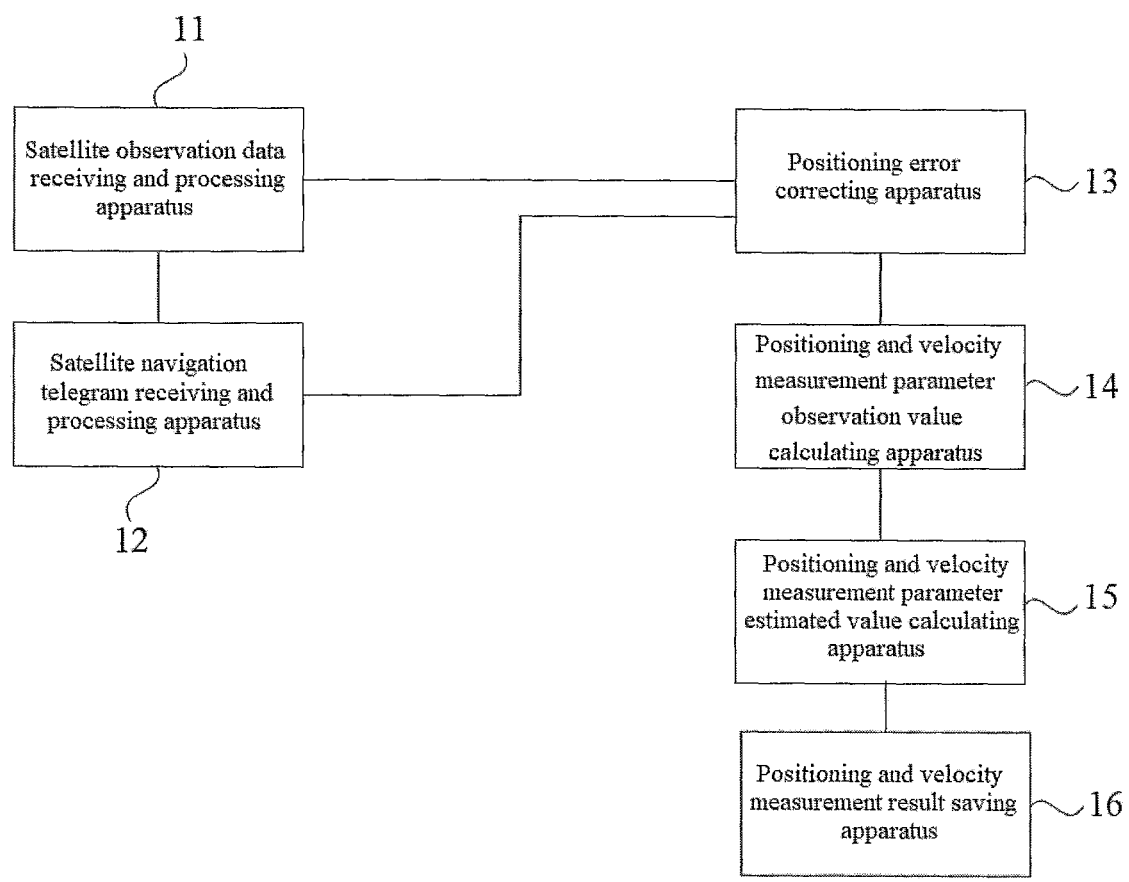
FIG. 2 is a schematic structural diagram of a rapid and precise positioning system according to an embodiment of the present application.

FIG. 2 shows a positioning system according to an embodiment of the present application. Wherein the medium-, high-, low-orbit constellation multi-frequency information sources include the multi-frequency information sources of at least one of all existing satellite navigation systems and the LEO augmentation satellite navigation system.

As shown in FIG. 2, the positioning system according to an embodiment of the present application includes: a satellite observation data receiving and processing apparatus 11, a satellite navigation telegram receiving and processing apparatus 12, a positioning error correcting apparatus 13, a positioning and velocity measurement parameter observation value calculating apparatus 14, a positioning and velocity measurement parameter estimated value calculating apparatus 15 and a positioning and velocity measurement result saving apparatus 16.

Wherein the satellite observation data receiving and processing apparatus 11 is configured for acquiring observation data of navigation satellites and LEO augmentation satellites at each epoch and preprocessing the data.

The satellite navigation telegram receiving and processing apparatus 12 is configured for acquiring navigation telegrams of the navigation satellites and the LEO augmentation satellites at each epoch, and at the same time obtaining precise orbit and clock bias of the navigation satellites and of the LEO augmentation satellites according to the acquired navigation telegrams of the LEO augmentation satellites. In an embodiment, the satellite navigation telegram receiving and processing apparatus 12 includes a navigation satellite navigation telegram receiving and processing unit and a LEO augmentation satellite navigation telegram receiving and processing unit.

The positioning error correcting apparatus 13 is configured for correcting errors received in the positioning process according to the acquired navigation telegrams. In an embodiment, the positioning error correcting apparatus 13 includes a navigation satellite error correcting unit and a LEO augmentation satellite error correcting unit.

The positioning and velocity measurement parameter observation value calculating apparatus 14 is configured for normalizing by taking a type of satellite navigation system as reference to obtain unified linear observation equations, and calculating observation values of positioning and velocity measurement parameters according the unified linear observation equations.

The positioning and velocity measurement parameter estimated value calculating apparatus 15 is configured for estimating positioning and velocity measurement parameters at the present epoch according to the calculated observation values of positioning and velocity measurement parameters and the saved estimated values of positioning and velocity measurement parameters at the previous epoch, to obtain estimated values of positioning and velocity measurement parameters at the current epoch through a state equation.

The positioning and velocity measurement result saving apparatus 16 configured for generating and saving positioning and velocity measurement results at the current epoch according to the estimated values of positioning and velocity measurement parameters at the current epoch.

Figure 3:
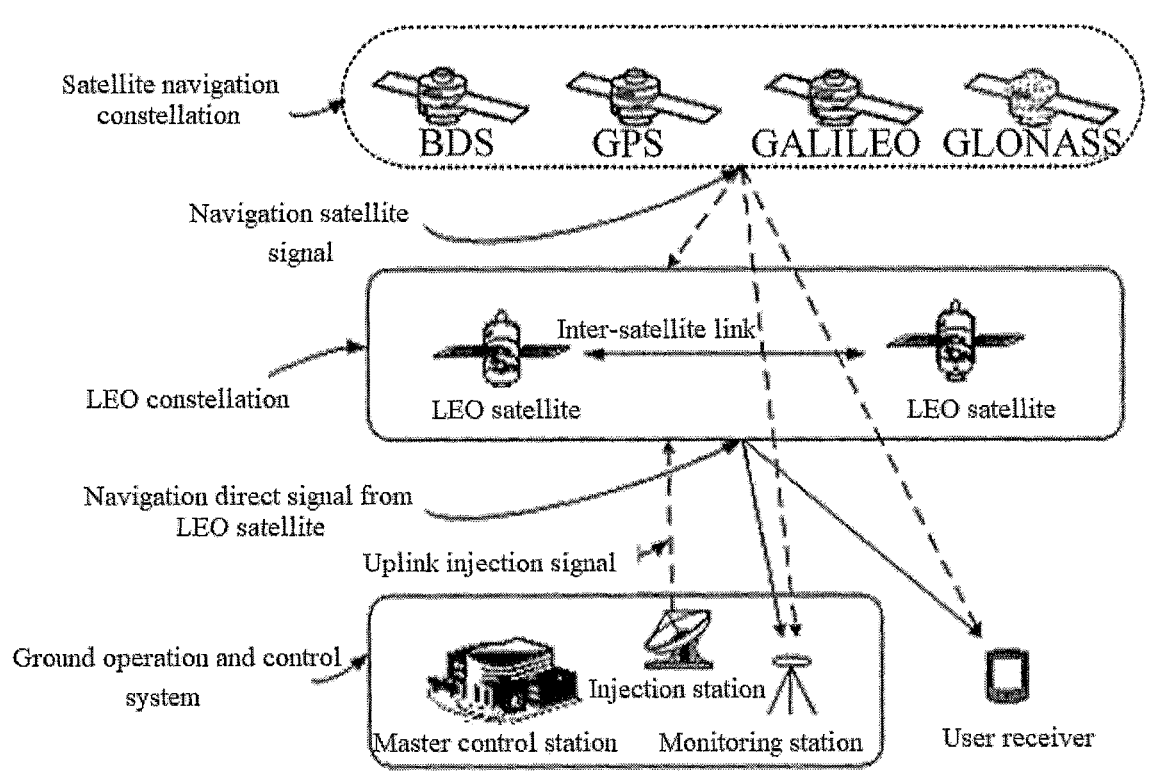
FIG. 3 is a flow chart of a fast and precise positioning method according to an embodiment of the present application.

FIG. 3 is a schematic diagram of the working principle of a fast and precise positioning method provided by an embodiment of the present application. Wherein the implementation of the positioning method may include a navigation satellite constellation, a LEO constellations, a ground operation and control system, and a user receiver having a screen capable of displaying data. Wherein: the navigation satellite constellation includes at least one of the US GPS, China Beidou, EU Galileo and Russian GLONASS satellite navigation systems, and is configured for broadcasting navigation satellite signals. The LEO constellation includes multiple LEO satellites distributed on multiple orbital planes, and the multiple LEO satellites broadcast navigation direct signals based on high-precision time-frequency references through specific frequency bands to provide stable coverage of the world or specific service areas, and is configured for broadcasting navigation direct signals and navigation augmentation information. The ground operation and control system performs business calculation and processing, and controls and manages the satellites and the constellations. The user receiver receives navigation direct signals broadcasted by the navigation satellites and the LEO satellites, as well as the navigation augmentation information broadcasted by the LEO satellites, and performs precise positioning, velocity measurement and timing based on the navigation direct signals from the navigation satellites and the LEO satellites and the navigation augmentation information.

The invention claimed is:

1. A fast and precise positioning method, characterized in that the method comprises following steps implemented by a user receiver:
    a step 1 of acquiring observation data of navigation satellites and Low Earth Orbit (LEO) augmentation satellites at a current epoch and preprocessing the observation data;
    a step 2 of respectively acquiring navigation telegrams of the navigation satellites and the LEO augmentation satellites, and obtaining precise orbit and clock bias of the navigation satellites and precise orbit and clock bias of the LEO augmentation satellites according to the acquired navigation telegrams of the LEO augmentation satellites;

a step 3 of correcting errors received in the positioning process according to the acquired navigation telegrams by model correction and parameter estimation;

a step 4 of normalizing by taking a type of satellite navigation system as reference to obtain unified linear observation equations, and calculating observation values of positioning and velocity measurement parameters;

a step 5 of obtaining estimated values of positioning and velocity measurement parameters at the current epoch through a state equation according to the calculated observation values of positioning and velocity measurement parameters and estimated values of positioning and velocity measurement parameters at the previous epoch;

a step 6 of generating and saving positioning and velocity measurement results at the current epoch according to the estimated values of positioning and velocity measurement parameters at the current epoch, the positioning and velocity measurement results defining a navigation map dataset; and a step 7 of displaying in real-time positioning and velocity of a moving carrier according to the navigation map dataset on a screen.

2. The positioning method as claimed in claim 1, wherein the unified linear observation equations comprise positioning observation equations, and if receiver clock bias $c\delta t_a^G$ corresponding to global positioning system GPS is taken as reference, then the positioning observation equations of the satellite navigation systems other than the GPS are:

$$\rho_{LC,a}^{S,s}=R_{a,0}^{S,s}-l\Delta x_a-m\Delta y_a-n\Delta z_a+m_a^{S,s}T_a+c\delta t_a^G+(d_{\rho_{LC},a}^{s}-d_{\rho_{LC},a}^{G})$$

$$\phi_{i,a}^{S,s}=R_{a,0}^{S,s}-l\Delta x_a-m\Delta y_a-n\Delta z_a+m_a^{S,s}T_a+c\delta t_a^G+(d_{\rho_{LC},a}^{s}-d_{\rho_{LC},a}^{G})+(d_{\rho_{LC}}^{S,s}-d_{\rho_{LC},a}^{s})+d_{\phi_{LC},a}^{S}-d_{\phi_{LC}}^{S,s})+\lambda_{LC}N_{LC,a}^{S,s}$$

wherein $m_a^{S,s}$ is a mapping function corresponding to a tropospheric delay parameter in a zenith direction of a monitoring station in a GNSS system, $T_a$ is the tropospheric delay parameter in the zenith direction of the monitoring station, $\rho_{LC,a}^{S,s}$ and $\phi_{LC,a}^{S,s}$ are respectively a pseudo-range and phase observation values of ionosphere-free combination, $d_{\rho_{LC},a}^{s}$ and $d_{\phi_{LC},a}^{s}$ are respectively hardware delays of the pseudo-range and phase observation values of ionosphere-free combination at the receiver side, $d_{\rho_{LC},a}^{s}$ and $d_{\phi_{LC},a}^{s}$ are respectively hardware delays of the pseudo-range and phase observation values of ionosphere-free combination at the satellite side;

$$\lambda_{LC}=\frac{c}{f_1+f_2}$$

is a wavelength of the observation values of ionosphere-free combination, c is a velocity of light in vacuum, $f_1$ is a carrier frequency at frequency point 1, $f_2$ is a carrier frequency at frequency point 2, $N_{LC,a}^{S,s}$ is a corresponding integer ambiguity parameter, and in the equations, $d_{\rho_{LC},a}^{s}-d_{\rho_{LC},a}^{G}$ is a difference between the hardware delays of the pseudo-range at the receiver side of the GPS and any of the satellite navigation systems other than the GPS, that is, a code bias; $R_{a,0}^{S,s}$ is a distance between station and satellite calculated according to the initial coordinates of the station and satellite, l, m, and n are linearization coefficients, and respectively are $$\frac{x^s-x_a}{\sqrt{(x^s-x_a)^2+(y^s-y_a)^2+(z^s-z_a)^2}},$$

$$\frac{y^s-y_a}{\sqrt{(x^s-x_a)^2+(y^s-y_a)^2+(z^s-z_a)^2}},$$

$$\frac{z^s-z_a}{\sqrt{(x^s-x_a)^2+(y^s-y_a)^2+(z^s-z_a)^2}},$$

$x^s$, $y^s$ and $z^s$ are coordinates of the satellite, $x_a$, $y_a$ and $z_a$ are the initial coordinates of the monitoring station, and $\Delta x_a$, $\Delta y_a$ and $\Delta z_a$ are respectively correction values thereof.

3. The positioning method as claimed in claim 2, wherein the unified linear observation equations comprise a velocity measurement observation equation, which is:

$$\dot{\phi}_{i,a}^{S,s}=l(\dot{x}_a-\dot{x}^S)+m(\dot{y}_a-\dot{y}^S)+n(\dot{z}_a-\dot{z}^S)+m_a^{S,s}\dot{T}_a+c\dot{\delta t}_a$$

$$\dot{\phi}_{i,a}^{S,s}=\frac{\phi_{i,a}^{S,s}(k+1)-\phi_{i,a}^{S,s}(k-1)}{2\Delta t}$$

wherein $\dot{\phi}_{i,a}^{S,s}$ denotes the rate of phase change between the monitoring station and the satellite in the unit of cycle/s, $\Delta t$ denotes the sampling interval, and $\dot{x}^s$, $\dot{y}^s$ and $\dot{z}^s$ are rates of the satellite, $\dot{x}_a$, $\dot{y}_a$ and $\dot{z}_a$ are the rates of the monitoring station, $\dot{\delta t}_a$ denotes a receiver clock velocity, $\dot{T}_a$ denotes a rate of change of the troposphere.

4. The positioning method as claimed in claim 2, wherein the navigation satellites comprise at least one of the US Global Positioning System GPS, China Beidou, EU Galileo, and Russian GLONASS satellite navigation systems.

5. A fast and precise positioning system, characterized in that the system is arranged in a user receiver and comprises:

a satellite observation data receiving and processing apparatus configured for acquiring observation data of navigation satellites and Low Earth Orbit (LEO) augmentation satellites at each epoch and preprocessing the observation data;

a satellite navigation telegram receiving and processing apparatus configured for respectively acquiring navigation telegrams of the navigation satellites and the LEO augmentation satellites at each epoch, and obtaining precise orbit and clock bias of the navigation satellites and precise orbit and clock bias of the LEO augmentation satellites according to the acquired navigation telegrams of the LEO augmentation satellites;

a positioning error correcting apparatus configured for correcting errors received in the positioning process according to the acquired navigation telegrams by model correction and parameter estimation;

a positioning and velocity measurement parameter observation value calculating apparatus configured for normalizing by taking a type of satellite navigation system as reference to obtain unified linear observation equations, and calculating observation values of positioning and velocity measurement parameters;

a positioning and velocity measurement parameter estimated value calculating apparatus configured for obtaining estimated values of positioning and velocity measurement parameters at a current epoch through a state equation according to the calculated observation values of positioning and velocity measurement parameters and saved estimated values of positioning and velocity measurement parameters at the previous epoch;

a positioning and velocity measurement result saving apparatus configured for generating and saving positioning and velocity measurement results at the current epoch according to the estimated values of positioning and velocity measurement parameters at the current epoch, the positioning and velocity measurement results defining a navigation map dataset; and a screen configured for displaying in real-time positioning and velocity of a moving carrier according to the navigation map dataset.

6. The positioning system as claimed in claim 5, wherein the satellite navigation telegram receiving and processing apparatus comprises a navigation satellite navigation telegram receiving and processing unit and a LEO augmentation satellite navigation telegram receiving and processing unit.

7. The positioning system as claimed in claim 5, wherein the positioning error correcting apparatus comprises a navigation satellite error correcting unit and a LEO augmentation satellite error correcting unit.

8. The positioning system as claimed in claim 5, wherein the unified linear observation equations comprise positioning observation equations, and if receiver clock bias $c\tilde{\delta t}_a^G$ corresponding to global positioning system GPS is taken as reference, then the positioning observation equations of the satellite navigation systems other than the GPS are:

$$\rho_{LC,a}^{S,s} = R_{a,0}^{S,s} - l\Delta x_a - m\Delta y_a - n\Delta z_a + m_a^{S,s}T_a + c\tilde{\delta t}_a^G + (d_{\rho_{LC},a}^s - d_{\rho_{LC},a}^G)$$

$$\phi_{i,a}^{S,s} = R_{a,0}^{S,s} - l\Delta x_a - m\Delta y_a - n\Delta z_a + m_a^{S,s}T_a + c\tilde{\delta t}_a^G + (d_{\rho_{LC},a}^s - d_{\rho_{LC},a}^G) + (d_{\rho_{LC}}^{S,s} - d_{\rho_{LC},a}^s) + d_{\phi_{LC}}^s - d_{\phi_{LC}}^{S,s}) + \lambda_{LC}N_{LC,a}^{S,s}$$

wherein $m_a^{S,s}$ is a mapping function corresponding to a tropospheric delay parameter in a zenith direction of a monitoring station in a GNSS system, $T_a$ is the tropospheric delay parameter in the zenith direction of the monitoring station, $\rho_{LC,a}^{S,s}$ and $\phi_{LC,a}^{S,s}$ are respectively a pseudo-range and phase observation values of ionosphere-free combination, $d_{\rho_{LC},a}^s$ and $d_{\phi_{LC},a}^s$ are respectively hardware delays of the pseudo-range and phase observation values of ionosphere-free combination at the receiver side, $d_{\rho_{LC}}^{S,s}$ and $d_{\phi_{LC}}^{S,s}$ are respectively hardware delays of the pseudo-range and phase observation values of ionosphere-free combination at the satellite side;

$$\lambda_{LC} = \frac{c}{f_1 + f_2}$$

is a wavelength of the observation values of ionosphere-free combination, c is a velocity of light in vacuum, $f_1$ is a carrier frequency at frequency point 1, $f_2$ is a carrier frequency at frequency point 2, $N_{LC,a}^{S,s}$ is a corresponding integer ambiguity parameter, and in the equations, $d_{\rho_{LC},a}^S - d_{\rho_{LC},a}^G$ is a difference between the hardware delays of the pseudo-range at the receiver side of the GPS and any of the satellite navigation systems other than the GPS, that is, a code bias; $R_{a,0}^{S,s}$ is a distance between station and satellite calculated according to the initial coordinates of the station and satellite, l, m, and n are linearization coefficients, and are respectively $$\frac{x^s - x_a}{\sqrt{(x^s - x_a)^2 + (y^s - y_a)^2 + (z^s - z_a)^2}},$$

$$\frac{y^s - y_a}{\sqrt{(x^s - x_a)^2 + (y^s - y_a)^2 + (z^s - z_a)^2}},$$

$$\frac{z^s - z_a}{\sqrt{(x^s - x_a)^2 + (y^s - y_a)^2 + (z^s - z_a)^2}},$$

$x^s$, $y^s$ and $z^s$ are coordinates of the satellite, $x_a$, $y_a$ and $z_a$ are the initial coordinates of the monitoring station, and $\Delta x_a$, $\Delta y_a$ and $\Delta z_a$ are respectively correction values thereof.

9. The positioning system as claimed in claim 8, wherein the unified linear observation equations comprise a velocity measurement observation equation, which is:

$$\dot{\phi}_{i,a}^{S,s} = l(\dot{x}_a - \dot{x}^S) + m(\dot{y}_a - \dot{y}^S) + n(\dot{z}_a - \dot{z}^S) + m_a^{S,s}\dot{T}_a + c\dot{\delta t}_a$$

$$\dot{\phi}_{i,a}^{S,s} = \frac{\phi_{i,a}^{S,s}(k+1) - \phi_{i,a}^{S,s}(k-1)}{2\Delta t}$$

wherein $\dot{\phi}_{i,a}^{S,s}$ denotes a rate of phase change between the monitoring station and the satellite in a unit of cycle/s, $\Delta t$ denotes a sampling interval, and $\dot{x}^s$, $\dot{y}^s$ and $\dot{z}^s$ are the rates of the satellite, $\dot{x}_a$, $\dot{y}_a$ and $\dot{z}_a$ are the rates of the monitoring station, $\dot{\tilde{\delta t}}_a$ denotes a receiver clock velocity, $\dot{T}_a$ denotes a rate of change of a troposphere.

10. A non-transitory computer-readable storage medium storing at least one executable instruction, wherein the executable instruction is configured to cause a processor to perform a fast and precise positioning method, and the method comprises following steps implemented by a user receiver:

a step 1 of acquiring observation data of navigation satellites and Low Earth Orbit (LEO) augmentation satellites at a current epoch and preprocessing the observation data;

a step 2 of respectively acquiring navigation telegrams of the navigation satellites and the LEO augmentation satellites, and obtaining a precise orbit and a clock bias of the navigation satellites and a precise orbit and a clock bias of the LEO augmentation satellites according to the acquired navigation telegrams of the LEO augmentation satellites;

a step 3 of correcting errors received in the positioning process according to the acquired navigation telegrams by model correction and parameter estimation;

a step 4 of normalizing by taking a type of satellite navigation system as reference to obtain unified linear observation equations, and calculating observation values of positioning and velocity measurement parameters;

a step 5 of obtaining estimated values of positioning and velocity measurement parameters at the current epoch through a state equation according to the calculated observation values of positioning and velocity measurement parameters and estimated values of positioning and velocity measurement parameters at the previous epoch;

a step 6 of generating and saving positioning and velocity measurement results at the current epoch according to the estimated values of positioning and velocity measurement parameters at the current epoch, the positioning and velocity measurement results defining a navigation map dataset; and a step 7 of displaying in real-time positioning and velocity of a moving carrier according to the navigation map dataset on a screen.

\* \* \* \* \*